(12) United States Patent
Harju et al.

(10) Patent No.: US 8,391,862 B1
(45) Date of Patent: Mar. 5, 2013

(54) RSSI SCAN

(75) Inventors: Lauri Ilmari Harju, Turku (FI);
Richard Williams, Bagshot (GB); Kaj Jansen, Salo (FI); Lene Duus Bache, Halikko (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/554,132

(22) Filed: Jul. 20, 2012

(51) Int. Cl.
*H04W 36/14* (2009.01)

(52) U.S. Cl. ............... 455/434; 370/350; 455/422.1

(58) Field of Classification Search ............ 455/434, 455/411, 450, 453, 423, 422.1; 370/350, 370/324, 310, 331; 375/343
See application file for complete search history.

(56) References Cited

U.S. PATENT DOCUMENTS

| | | | |
|---|---|---|---|
| 7,961,707 B2 * | 6/2011 | Kim et al. | ........... 370/350 |
| 8,045,576 B2 | 10/2011 | Tsfaty et al. | |
| 2006/0153141 A1 | 7/2006 | Hirano | |
| 2007/0010241 A1 * | 1/2007 | Wachter et al. | ........... 455/423 |

FOREIGN PATENT DOCUMENTS

WO WO 2004/010719 A1 1/2004

* cited by examiner

*Primary Examiner* — Phuoc Doan
(74) *Attorney, Agent, or Firm* — Robert P. Michal; Lucas & Mercanti LLP

(57) ABSTRACT

Disclosed is a method, operation of a method, and a result of execution of computer program instructions embodied on a non-transitory computer readable memory in a user equipment which performs a first received signal strength indicator scan on a plurality of frequency bands, stores the results of the first received signal strength indicator scan in memory as a plurality of received signal strength indicator values, means for attempting synchronization with a radio access network based upon one or more received signal strength indicator values, in response to failing to obtain synchronization with a radio access network, performing a second received signal strength indicator scan on the plurality of frequency bands. The second received signal strength indicator scan can alternatively be controlled for radio frequency noise.

18 Claims, 6 Drawing Sheets

RSSI SCAN

FIELD OF THE INVENTION

The example and non-limiting embodiments of this invention relate generally to wireless communication systems, methods, devices and computer programs, and, more specifically, relate to cell searching employing a received signal strength indicator.

BACKGROUND

Conventional cell search techniques employed by user equipment (UE) to access legacy radio access networks (RANs) such as GSM EDGE Radio Access Networks (GERAN) and Universal Terrestrial Radio Access Networks (UTRAN) in an Evolved Universal Terrestrial Radio Access (E-UTRAN) consist of employing received signal strength indicator (RSSI) scans to detect these legacy RANs. RSSI is a value or measure which indicates the transmission power level of a predetermined center frequency within a predetermined bandwidth transmitted from a base transceiver station (BTS) or Node B in a GERAN or UTRAN cell, respectively. The UE measures the received signal strength at each predetermined interval and generates an RSSI at each predetermined interval. The frequencies corresponding to the highest RSSI measurements are recorded and form a candidate list on which to search for a UTRAN network.

Such conventional cell searches employing RSSI scans may be time consuming and resource intensive (i.e., they may reduce UE battery life). For example, t the result of the UE's search for legacy cells might not return results in certain instances, such as where two UTRAN cells are closely co-located (e.g., overlapping cells) or where a GERAN cell is in close proximity to a UTRAN cell.

SUMMARY

In a first example embodiment of the invention there is a method comprising performing a first received signal strength indicator scan on a plurality of frequency bands, storing the results of the first received signal strength indicator scan in memory as a plurality of received signal strength indicator values, attempting synchronization with a radio access network based upon one or more received signal strength indicator values, in response to failing to obtain synchronization with a radio access network, performing a second received signal strength indicator scan on the plurality of frequency bands.

In a second example embodiment of the invention there is an apparatus comprising at least one processor and at least one memory which stores a computer program. In this embodiment, the at least one memory with the computer program is configured with the at least one processor to cause the apparatus to at least performing a first received signal strength indicator scan on a plurality of frequency bands, storing the results of the first received signal strength indicator scan in memory as a plurality of received signal strength indicator values, attempting synchronization with a radio access network based upon one or more received signal strength indicator values, in response to failing to obtain synchronization with a radio access network, performing a second received signal strength indicator scan on the plurality of frequency bands.

In a third example embodiment of the invention there is a computer readable memory which stores a computer program, in which the computer program comprises performing a first received signal strength indicator scan on a plurality of frequency bands, storing the results of the first received signal strength indicator scan in memory as a plurality of received signal strength indicator values, attempting synchronization with a radio access network based upon one or more received signal strength indicator values, in response to failing to obtain synchronization with a radio access network, performing a second received signal strength indicator scan on the plurality of frequency bands.

In a fourth example embodiment of the invention there is a means for performing a first received signal strength indicator scan on a plurality of frequency bands, storing the results of the first received signal strength indicator scan in memory as a plurality of received signal strength indicator values, attempting synchronization with a radio access network based upon one or more received signal strength indicator values, in response to failing to obtain synchronization with a radio access network, performing a second received signal strength indicator scan on the plurality of frequency bands.

In an alternative embodiment the first received signal strength indicator scan can alternatively be controlled for radio frequency noise.

These and other embodiments and aspects are detailed below with particularity.

The foregoing and other aspects of the some example embodiments of this invention are further explained in the following Detailed Description, when read in conjunction with the attached Drawing Figures.

DETAILED DESCRIPTION

Some example embodiments of this invention provide apparatus, methods, and computer programs that provide an enhanced RSSI scan of available frequency bands to determine the availability of one or more legacy radio access networks (hereinafter "legacy cells"). In one exemplary embodiment of the invention, a UE performs a cell search by employing a two-step RSSI scan. In yet another further example embodiment, the second search is skipped if the results of the first RSSI scan match a particular property of radio frequency (RF) noise.

"RSSI scans" as described throughout this disclosure are not actually detecting a radio access networks (RANs) but instead are detecting the possible frequencies where a RAN such as a legacy RAN (e.g. GERAN and/or UTRAN cells) might be transmitting a signal (e.g. where camping a UE might be possible.) The higher the RSSI value for a channel/frequency, the more probable it is to get a UE to synchronize with a BTS or Node B on that channel/frequency.

Figure 1A:
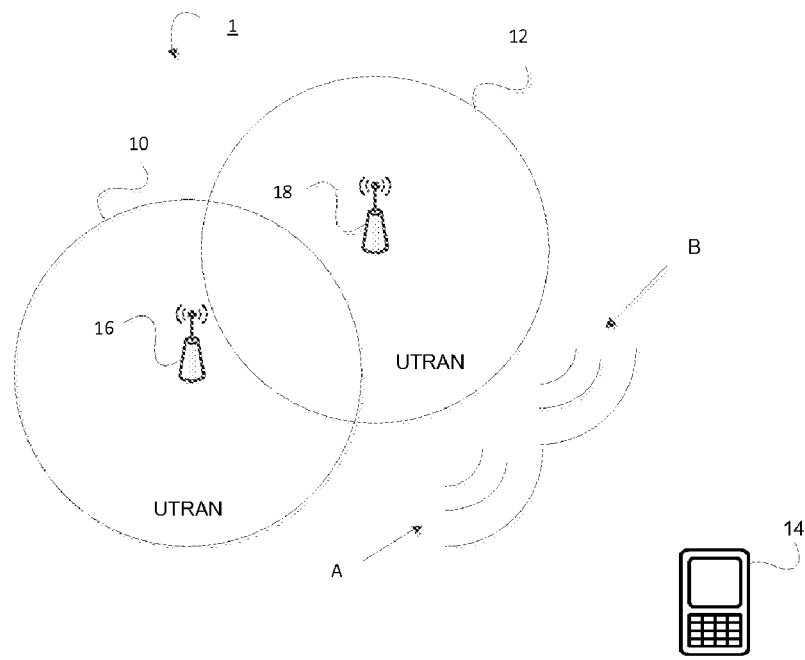
FIG. 1(a) depicts a first example scenario in which two co-located UTRAN cells are located in proximity to user equipment (UE) in accordance with some example embodiments of the present invention. The idea is that the cells are closely located in frequency.
Figure 1B:
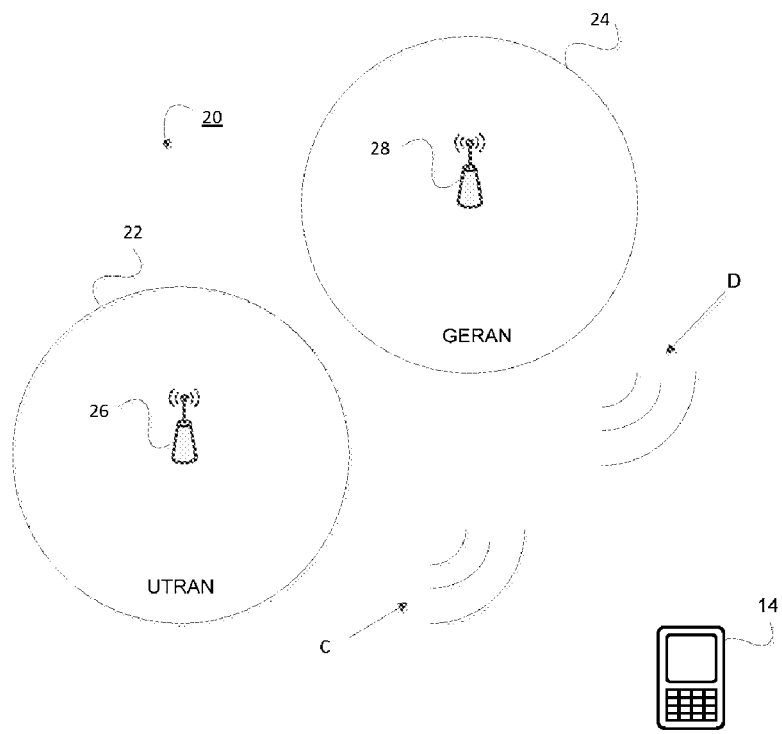
FIG. 1(b) depicts a second example scenario in which a UTRAN cell and GERAN cell are located in proximity to user equipment (UE) in accordance with some example embodiments of the present invention. The idea is that the cells are closely located in frequency but also that the GERAN cell is probably detected as a higher power than the UTRAN cell since it is has a narrower bandwidth.

Referring now to FIGS. 1(a) and 1(b), two examples scenarios are shown in which legacy cells are located in proximity to a UE in accordance with example embodiments of the present invention. FIG. 1(a) depicts a first scenario 1 in which a first UTRAN cell 10 is at least partially co-located with a second UTRAN cell 12. Example embodiments of the present invention can apply to other RAN cell deployment scenarios including multiple GERAN, UTRAN and E-UTRAN cells. In fact, the two UTRAN substantially at least partially overlap one another. A UE 14 is located in proximity to the two UTRAN cells and is capable of measuring a first center frequency A transmitted from a first Node B (16) and a second center frequency B transmitted from a second NodeB (18). The terms "overlap" or "overlapping" as applied to the scenario in FIG. 1(a) refers to the overlapping of frequencies transmitted from first Node B (16) and second Node B (18) in each UTRAN cell and not the distance between the UTRAN cell 10 and UTRAN cell 12. Although not shown in FIG. 1(a), this scenario could include overlapping of frequencies transmitted from multiple Node Bs (including possibility remote radio equipment such as for example one or more Remote Radio Heads (RRHs)). Also, a characteristic of the scenario in FIG. 1(a) is that each Node B is transmitting at about the same power levels. For example, the center frequencies may be for 3.6 MHz apart and since the bandwidth of each cell is 5 MHz, the two UTRAN cells' frequencies will overlap and interfere with one another.

In FIG. 1(b), a second scenario 20 is shown in which UE 14 is proximally located to a third UTRAN cell 22 and a co-located GERAN cell 24. UE 14 is in this second scenario 20 capable of measuring a third center frequency C transmitted from a third Node B 26 and a fourth center frequency D transmitted from a BTS 28. The terms "proximally located" and "co-located" as applied to the scenario in FIG. 1(b) refers to a situation where at least one base transceiver station (BTS) transmits at frequencies at or near the frequencies transmitted by at least one nearby Node B. The scenario in FIG. 1(a) also covers a situation where the frequencies of one or more BTSs and one or more Node Bs substantially overlap one another similar to the scenario shown in FIG. 1(a). Also, a characteristic of the scenario in FIG. 1(b) is the GERAN cell 24 is likely detected as at a higher power level than the UTRAN cell 22 because the GERAN cell 24 is operating at a narrower bandwidth.

Figure 2:
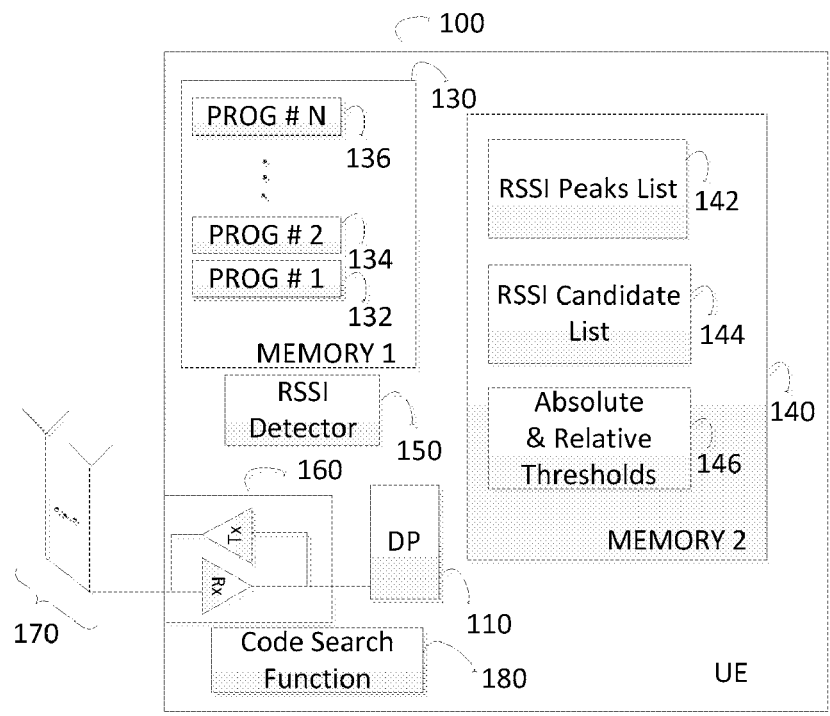
FIG. 2 is a simplified block diagram of user equipment (UE), which is an example of a device suitable for use in practicing some example embodiments of the invention.

Referring now to FIG. 2, a simplified block diagram of a UE 100 is shown as an example electronic device suitable for use in practicing some example embodiments of the invention. UE 100 includes one or more processors, such as at least one data processor (DP) 110, a first computer-readable memory 130 which stores a plurality of computer programs such as PROG #1 (132), PROG #2 (134) and PROG #N (136), suitable for carrying out the various example embodiments of the present invention. A second computer-readable memory 140 stores RSSI data received from the RSSI detector 150 in an ordered list of frequencies which is available as an RSSI peaks list 142. The DP 110 and PROG #1 (132) can employ the RSSI peaks list 142 in performing the code search function 180, which is an attempt to synchronize to a UTRAN cell in accordance with some example embodiments of the present invention. For example, an ordered list of frequencies obtained from an RSSI scan of a band of interest is stored in RSSI peaks list 142. The second computer-readable memory 144 stores the RSSI peaks list as well as up to ±4 frequencies from each peak as a candidate list. PROG #2 (134) employs the RSSI candidate list 144 in performing the code search function 180 in accordance with some example embodiments of the present invention. The memory 140 may also store various other parameters, such as the number of channels to remove from a first and a second RSSI scan in accordance with some example embodiments of the present invention. Moreover, memory 140 may also store various other control parameters for detecting RF noise in accordance with some embodiment of the present invention. For example, PROG #N (136), together with DP 110, can access absolute and relative thresholds 146 stored in the second memory 140 for carrying out example embodiments which compare noise properties of each band received in a first RSSI scan to RF noise. Although, FIG. 2 depicts a first computer-readable memory 130 and second computer-readable memory 144, UE 100 may include one or more additional memories or less memory units for carrying out the example embodiment of the present invention. Moreover, the programs described above (e.g. PROG #1 (132), PROG #2 (134) and PROG #N (136), and the data (e.g. RSSI Peaks List 142, RSSI Candidate List 144, Absolute & Relative Thresholds 146, and other parameters) are not limited to a specific memory location (e.g. first computer-readable memory 130 and second computer-readable memory 144). FIG. 2 is merely one possible non-limiting example embodiment of the present invention.

UE 100 may also include a plurality of radio access communication modules 160 and/or a plurality of radio access technology antennas 170. The radio access communication module 160 can be a Long term evolution/long term evolution advanced (LTE/LTE-A) transceiver, or any similar transceiver. Such non-limiting examples include any other transceiver capable of communicating with a universal mobile telecommunications system, an evolved universal mobile telecommunications Terrestrial Radio Access Network, a Global System for Mobile communications, a Universal Terrestrial Radio Access network, or cellular networks employing Wideband Code Division Multiple Access or High Speed Packet Access.

Figure 3:
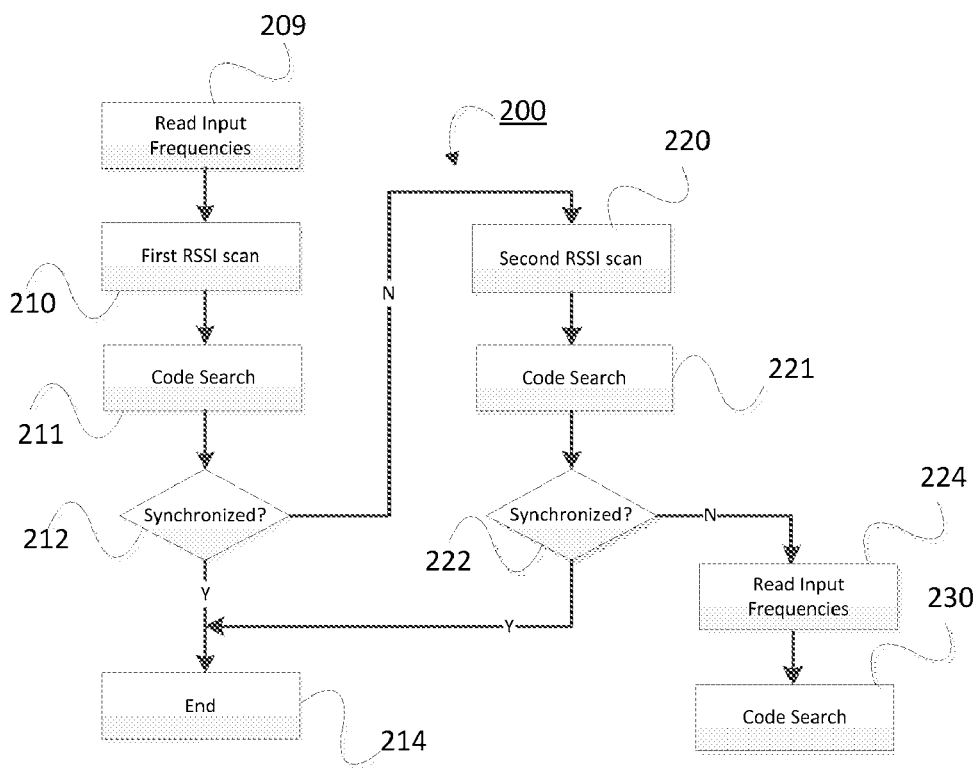
FIG. 3 is a logical flow diagram that illustrates the operation of a method, and a result of execution of computer program instructions embodied on a non-transitory computer readable memory, (e.g. in a user equipment) which provides a RSSI scan in accordance with some example embodiments of the invention.

Referring now to FIG. 3, a logical flow diagram is shown which illustrates the operation of a method, and a result of execution of computer program instructions embodied on a non-transitory computer readable memory (e.g. in a user equipment) which provides a RSSI scan in accordance with some example embodiments of the invention. As shown in FIG. 3, a UE performs a cell search by employing a two-step RSSI scan 200.

A first RSSI scan 210 measures the signal strength of every third frequency in the frequency bands of interest, or every frequency of a discrete set of frequencies; depending on an external set of input frequencies 209 determined by another software program. In one possible embodiment, the first RSSI 210 scan can be set with a 0.2 MHz raster to obtain an accurate list of candidates would reflect all the possible frequencies of all available GERAN and/or UTRANs cells. In another possible example embodiment of the present invention, a 5 MHz wide scan can be performed with a 0.6 MHz raster which is obviously faster and can still tolerate fading.

The resulting measurements from the first RSSI scan 210 are stored as RSSI values in the UE and accessed by the UE to attempt a first synchronization 212 with a UTRAN cell. In one non-limiting example, the first synchronization 212 is attempted by a first code search 211 of a list of the resulting RSSI values from a discrete set of frequencies by the UE (e.g. RSSI list search). For example, in one possible embodiment, the first code search 211 includes a predetermined number of highest peak values selected from the RSSI scan values obtained from the first RSSI scan 210 and taken as candidates. One non-limiting example of a code search parameter could require that 20 frequencies be deleted from each side of these predetermined high peak values (along with the center frequency). These 40 frequencies are likely transmitted from the same cell (e.g. center frequency) and hence redundant data. The first code search 211 can be configured to remove any amount of frequencies within a band of interest and the 20 frequency example set forth above is merely a non-limiting example for illustrative purposes.

With the parameters set in the first code search 211, the UE will attempt the first synchronization 212 with a UTRAN cell or a GERAN cell by working its way through an ordered list of the RSSI values (e.g., attempting synchronization on the frequency having the highest RSSI value first, then next highest RSSI value and so on). In another non-limiting example, a band of RSSI values is compiled into a scan list (i.e., RSSI band scan). In this example, a predetermined number of the highest RSSI peak values are compiled into the scan list (±4, for instance as a non-limiting example). The first synchronization 212 is then attempted with a UTRAN cell or GERAN cell. If the first synchronization 212 is not achieved in the first RSSI scan, yet significantly high RSSI values are present, then a second RSSI scan 220 is performed to double check the first RSSI scan 210. Alternatively, if the first synchronization 212 is achieved between the UE and a UTRAN cell or GERAN cell, then the two-step RSSI scan is completed 214. In the event that a second RSSI scan 220 is required, the same input frequencies 209 that were measured for the first RSSI scan 210 is used for the second RSSI scan 220. However, in the second RSSI scan 220, the parameters of the second code search 221 of the resulting RSSI data are altered to perform an expansive search of the available frequencies. For example, using the above non-limit example of a first RSSI scan 210 using a parameter of removing 40 center frequencies for illustrative purposes. In such a situation removing these 40 frequencies may actually delete the real center frequencies of a GERAN or UTRAN cells (e.g. thereby removing the possibility of connectivity of such a legacy cell which is within close proximity of the UE). This is why a second RSSI 220 employing a second code search 221 is required.

In one possible example embodiment, the second RSSI scan 220 includes a second code search 221 using a parameter of removing 28 channels (e.g. 14 frequency from the left of the center frequency and 14 from the right of the center frequency) plus the center frequency. This generates more RSSI peaks as possible candidates for the second synchronization 222. The second code search 211 can be configured to remove any lesser or greater amount of frequencies within the band of interest and the 14 frequency example set forth above is merely a non-limiting example for illustrative purposes.

If the second synchronization 222 is achieved between the UE and a UTRAN cell, then the two-step RSSI scan is completed 214. If the second synchronization fail, a third code search 230 can be employed based on a new or the same set of input frequencies 224.

Figure 4A:
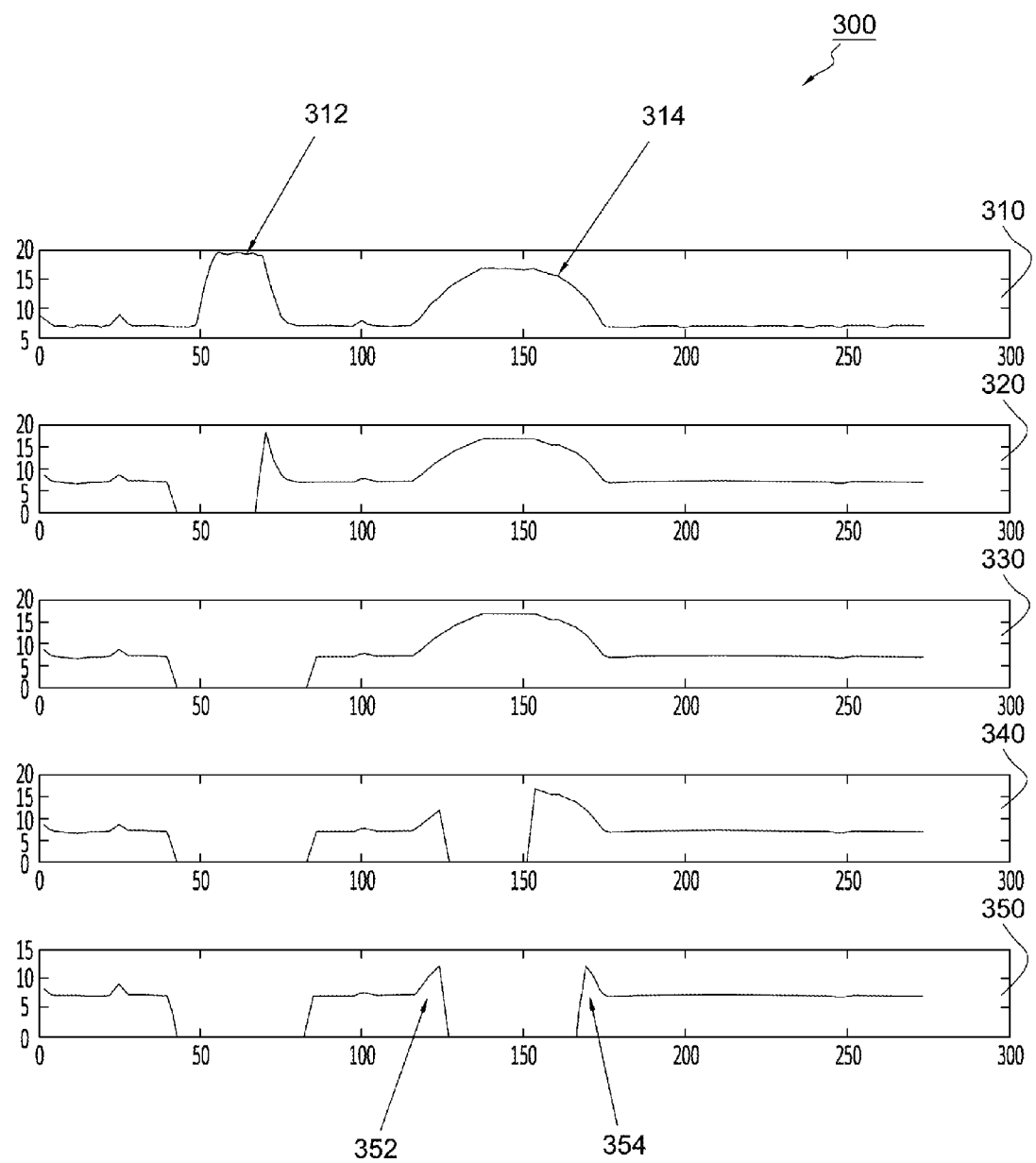
FIG. 4(a) shows the output of the second RSSI scan showing the detection of two co-located UTRAN cells in accordance with some example embodiments of the present invention.

Referring now to FIG. 4(a), which is the output of the second RSSI scan, and shows where two co-located UTRAN cells with a GERAN cell 300 are detected in accordance with some example embodiment of the present invention. Example embodiments of the present invention can apply to other RAN cell deployment scenarios including multiple GERAN, UTRAN and E-UTRAN cells. FIG. 4(a) is merely one possible example illustration of the embodiments of the present invention other embodiments could detect multiple UTRAN (e.g. more than two UTRAN cells) co-located with multiple GERAN cells (e.g. more than one GERAN cell). In FIG. 4(a), a GERAN cell 312 is detected to the left of two co-located UTRAN cells 314 from the RSSI band scan 310. Having detected an RSSI peak 312, this part of the spectrum is removed by eliminating the 28 channels, plus the center frequency, resulting in spectrum 320. The next frequency with the strongest RSSI is identified and removed, resulting in spectrum 330. This process of identifying the frequency with the strongest RSSI peak and removing its spectrum is repeated 340, 350 until there are no more RSSI peaks. This way the GERAN cell 312 and, finally at step 350) the two co-located UTRAN cells 352 and 354 can be separated. In one non-limiting embodiment, the second scan covers co-located legacy cells in the range of 3.6 MHz to 4.0 MHz apart.

Figure 4B:
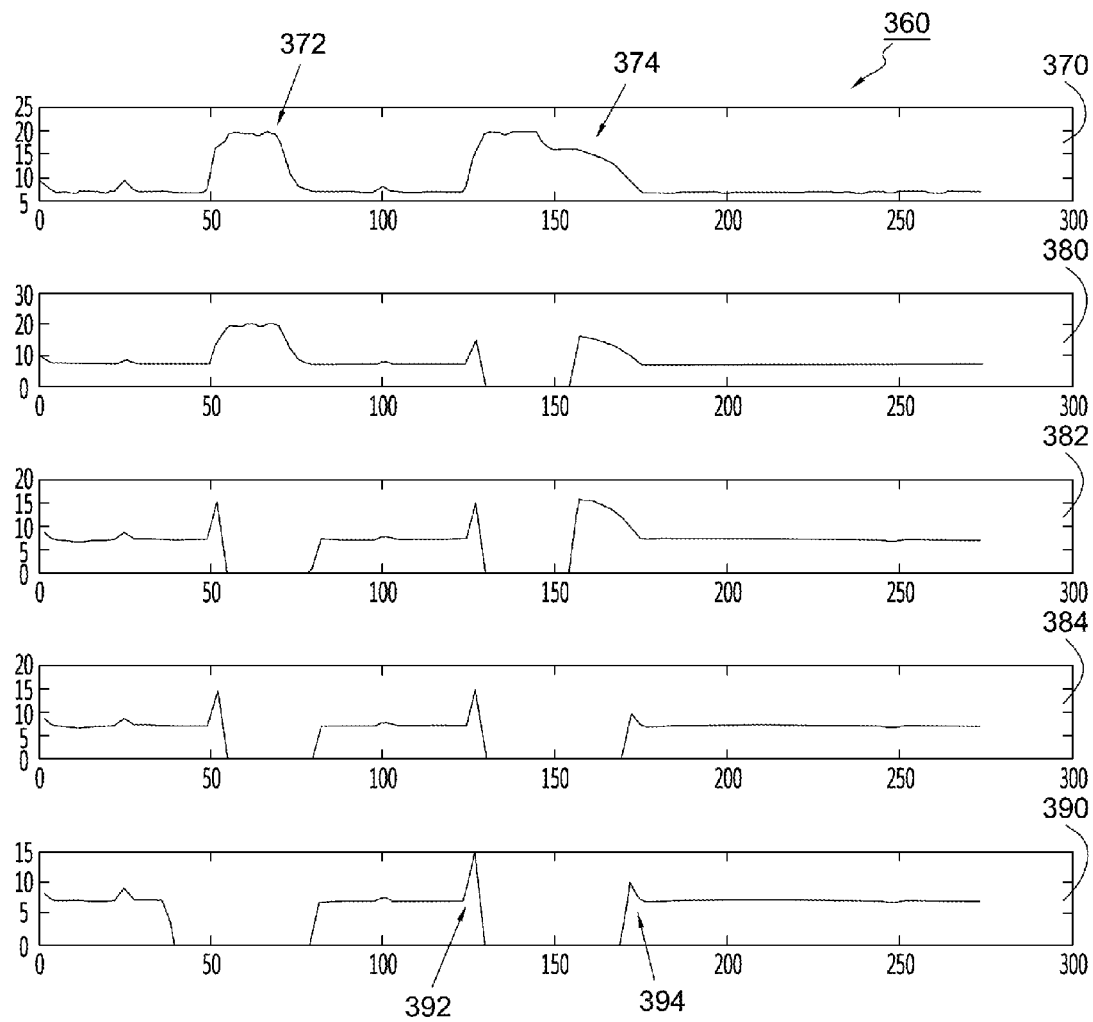
FIG. 4(b) shows the output of the second scan showing the detection of a UTRAN cell and GERAN cell in accordance with some example embodiments of the present invention.

Referring now to FIG. 4(b), which is the output of the second RSSI scan, and shows the detection of co-located GERAN and UTRAN cells 360 in accordance with an example embodiment of the present invention. FIG. 4(b) is merely one possible example illustration of the embodiments of the present invention other embodiments could detect multiple UTRAN (e.g. more than two UTRAN cells) co-located with multiple GERAN cells (e.g. more than one GERAN cell). More specifically, FIG. 4(b) illustrates the detection of a GERAN cell 372 co-located with a UTRAN cell 374 (as shown in FIG. 1(b) as reference numerals 24 and 22 respectively). In FIG. 4(b), a GERAN cell 372 is detected to the left of another GERAN cell co-located with UTRAN cells 374 in a first RSSI band scan 370. A second RSSI peak 380 does not succeed at removing the presence of a GERAN cell located to the left of the co-located GERAN and UTRAN cells 374. A third RSSI peak 382 does, however, remove the appearance of the GERAN cell. The fourth RSSI peak 384 and fifth RSSI peak 390 do clearly delineate the difference between a GERAN 392 and a co-located UTRAN cell 394. In one non-limiting embodiment, the second scan covers co-located legacy cells in the range of 3.6 MHz to 4.0 MHz apart.

Figure 5:
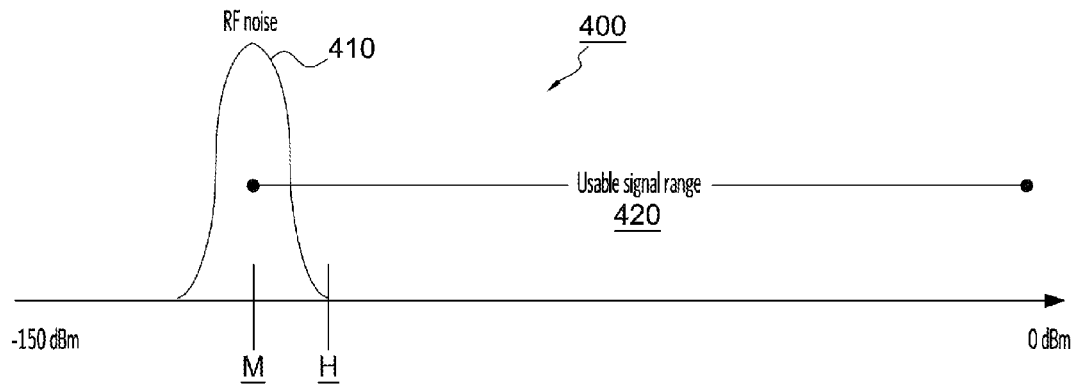
FIG. 5 is an illustration of RF noise distribution and usable signal range in accordance with an alternative example embodiment of the present invention.

The above described apparatus, methods, and computer programs providing a two-step RSSI scan can be further controlled in accordance with yet another further non-limiting example embodiment. That is, so that the second RSSI scan is skipped if the results of the first RSSI scan match a particular property of noise. Referring now to FIG. 5, an illustration of RF noise distribution 410 and usable signal range 420 over −110 dBm range 400 is shown in accordance with an alternative non-limiting example embodiment of the present invention. As shown in FIG. 5, M indicates the mean of the Gaussian function and H is the standard deviation. If the RSSI is high (far over the H), the channel has a high probability that some sort of signal is on the channel. This level is called the absolute threshold as all signals higher than H can be considered as very good candidates for synchronization with a legacy cell.

However, M and H might be in different places, depending on the band and implementation, which implies that the absolute threshold cannot be set to a very low level. In order to detect usable channel/band below the absolute threshold a relative threshold is employed. That is, as H is not known, the absolute threshold cannot be used. The shape of the RF noise distribution 410 is Gaussian and as such is consistent, which means that if the results are ordered by their RSSI values, the highest values are near each other if there is only RF noise on the band. Moreover, if no peak values are found in the first RSSI scan, a second RSSI scan is not performed. Accordingly, a signal will not be detected if it is some dB below the RF noise.

The "relative threshold" as used in this disclosure refers to detecting signals from a band of interest where the strongest peak is less than the absolute threshold. The idea behind the relative threshold is that if a band of interest contains only RF noise then the RSSI values will be forming the noise distribution. As such we are not interested in determining where the M is located but instead interested in knowing what the strongest RSSI values are (e.g. if they form the tail of the distribution nearby H). The RSSI scan is not used for detecting signals below the RF noise. However, this relative threshold reveals some channels if they are at or close to the RF noise level as the RSSI becomes a little higher than the RF noise and thus the tail is not formed (by the N strongest peaks) in the same way as it would be with only RF noise.

To determine the relative threshold, the N highest RSSI values of the first RSSI scan are compared (the maximum distance is calculated) to noise properties to see if they may form the tail in the noise distribution. N may be selected such that it is sufficiently improbable to have a significant number of channels with real signals at the same level on the same band. N may be also selected such that the relative threshold doesn't have to be very high, as that will decrease the detection performance. There can be common N for all bands, or the N can be scaled depending on the size of the band. As there are less/more channels on the band there have to be less/more measured RSSI levels within the specified range from the strongest to weakest.

In one non-limiting example embodiment of the present invention, control decisions about using the second RSSI scan in the above two-step RSSI scan can be made separately for every band. This means that the search time may be reduced due to the fact that some bands may not need to be re-scanned, for example. Moreover, the second RSSI scan is attempted only in continuous bands or continuous parts of the band and if the first RSSI scan produced some candidates. Obviously, the second RSSI scan is not attempted if the first RSSI scan resulted in a successful initial synchronization. For each band, the first RSSI scan results are evaluated to see if they match given RF noise properties and, based on that, the decision regarding whether to perform the second RSSI will be made. RF noise has two main properties: It is weak and it is relatively flat. The RF noise is typically very weak so that weak base station signals can be used. The flatness or the variation of the noise is dependent on the RF.

Figure 6A:
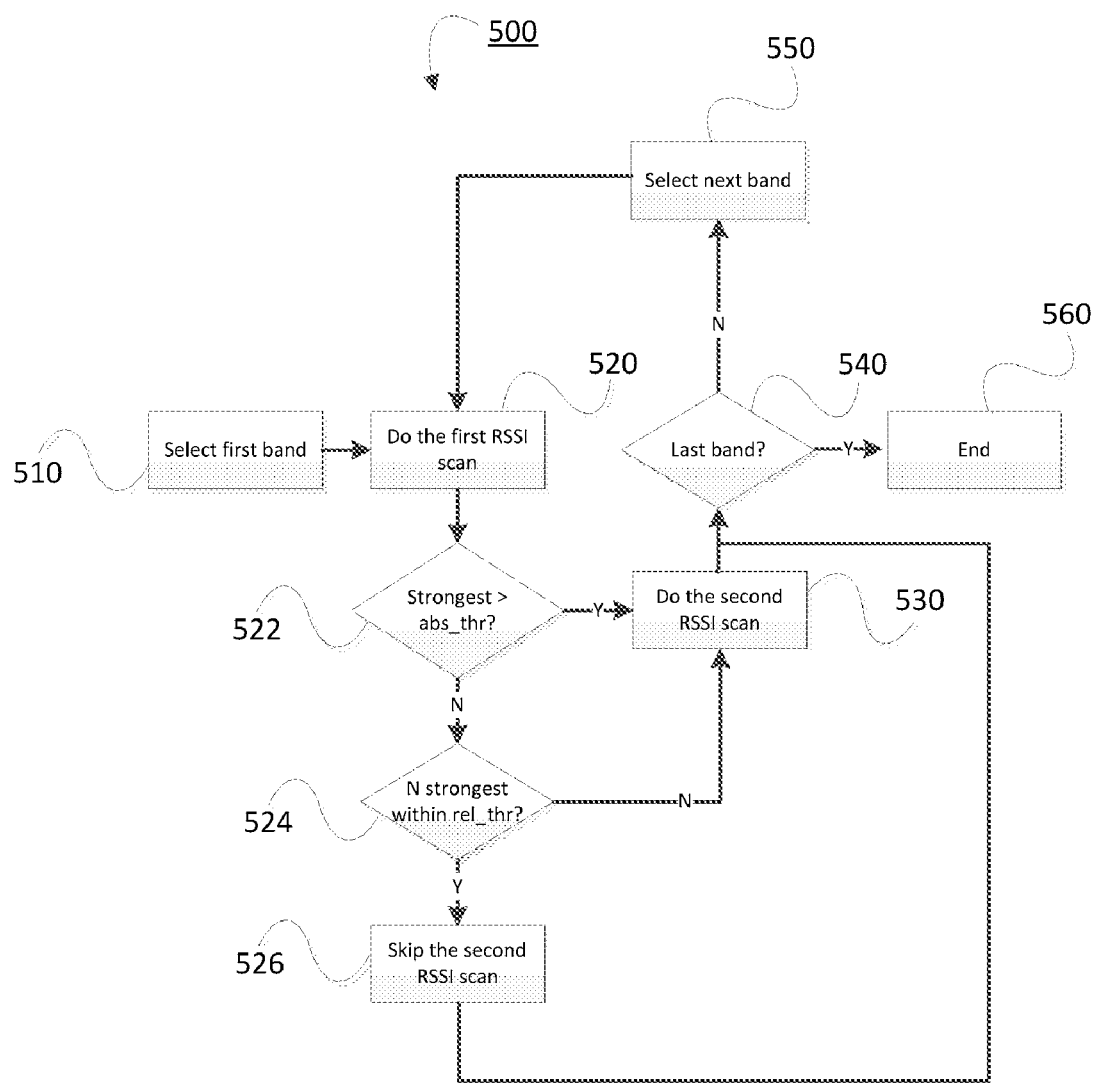
FIG. 6(a) is a logic flow diagram that illustrates the operation of a method, and a result of execution of computer program instructions embodied on a non-transitory computer readable memory (e.g. in a user equipment) which controls the two-step RSSI scan for RF noise, in accordance with some example embodiments of this invention.
Figure 6B:
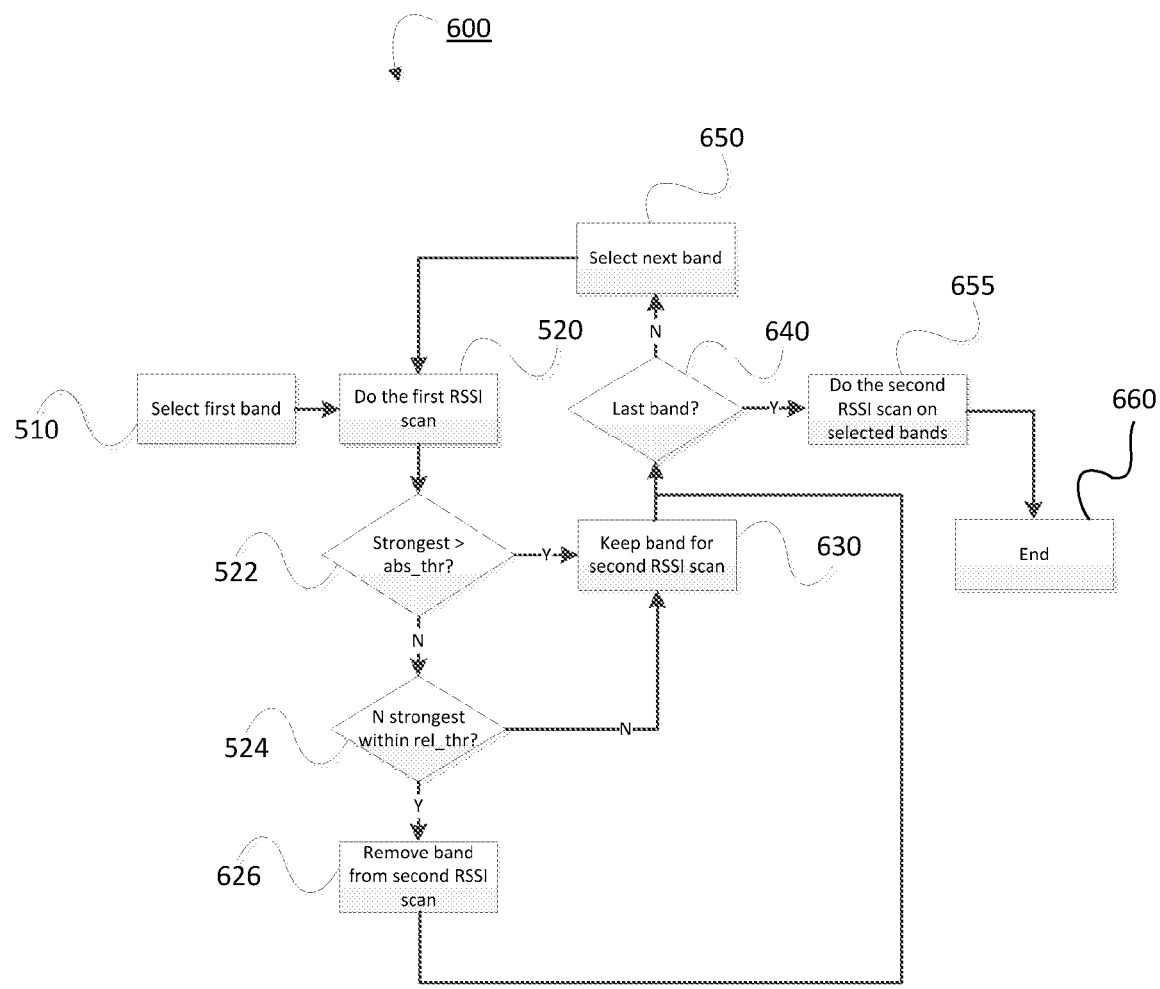
FIG. 6(b) is a logic flow diagram that illustrates the operation of a method, and a result of execution of computer program instructions embodied on a non-transitory computer readable memory (e.g. in a user equipment) of an alternative example embodiment which controls the two-step RSSI scan for RF noise, in accordance with some example embodiments of this invention.

FIG. 6(*a*) is a logic flow diagram that illustrates the operation of a method, and a result of execution of computer program instructions embodied on a non-transitory computer readable memory in a user equipment which controls the RSSI scan for RF noise 500, in accordance with some non-limiting example embodiments of this invention. As shown in FIG. 6(*a*), a first frequency band of a set of several predetermined bands is selected 510. Next, a first RSSI scan is performed 520 on the first frequency band 510. The results of the RSSI scan are compared to the absolute threshold to determine if the strongest peak value 522 exceeds the absolute threshold. If the absolute threshold is not exceeded, the strongest peak value, and a predetermined number N of the highest RSSI values are compared to the relative threshold 524. If the N strongest results of the first RSSI scan are within the relative threshold, the second RSSI scan is skipped 526, and this frequency band is removed from the second RSSI scan. On the other hand, if the strongest peak value exceeds the absolute threshold, then a second RSSI scan 530 for this band may still be performed. Next, it is predetermined whether additional bands need to be tested, in other words, is the previously tested frequency band the last band 540. If yes, the operation ends 560. Alternatively, the next band is selected 550.

An alternative example embodiment of a method, and a result of execution of computer program instructions embodied on a non-transitory computer readable memory in an user equipment which controls the RSSI scan for RF noise 600, in accordance with some non-limiting example embodiments of this invention. The method steps and/or results of execution of computer program instructions shown in FIG. 6(*b*) 510, 520, 522, 524 are the same as those in FIG. 6(*a*) as such the same reference characters are disclosed in FIG. 6(*a*). However following, the decision block labeled 524, additional steps/operations/functions are performed. That is the removal of the band from the second RSSI scan 626 and the generation of a list of the bands that can be RSSI scanned a second time which is maintained in memory 630. Once all the bands have been scanned once, the modified second RSSI scan 655 is performed on only those selected bands. Next, it is predetermined whether additional bands need to be tested, in other words, is the previously tested frequency band the last band 640. If yes, the operation ends 660. Alternatively, the next band is selected 650.

In these regards, the non-limiting example embodiments of this invention may be implemented at least in part by computer software stored on the non-transitory memory which is executable by a processor, or by hardware, or by a combination of tangibly stored software and hardware (and tangibly stored firmware). Electronic devices implementing these aspects of the invention need not be the entire devices as depicted at FIG. 2, but example embodiments may be implemented by one or more components of same, such as the above-described tangibly stored software, hardware, firmware and processor or micro-controllers, or a system on a chip (SOC) or an application specific integrated circuit (ASIC).

Various embodiments of the computer readable memory such as those disclosed in FIG. 2 include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the data processors include, but are not limited to, general purpose computers, special purpose computers, microprocessors, digital signal processors (DSPs) and multi-core processors.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device." The reference throughout this disclosure to a UE may be embodied on a cellular phone, a personal digital assistant (PDA), a wireless modem, a wireless communication device, a laptop, a netbook, a tablet or any other device cable of communicating with a E-UTRAN, UTRAN or GERAN enabled device.

Further, some of the various features of the above non-limiting example embodiments may be used to advantage without the corresponding use of other described features. The foregoing description should therefore be considered as merely illustrative of the principles, teachings and example embodiments of this invention, and not in limitation thereof.

The invention claimed is:

1. A method, comprising:
   performing a first received signal strength indicator scan on a plurality of frequency bands;
   storing the results of the first received signal strength indicator scan in memory as a plurality of received signal strength indicator values;
   attempting synchronization with a radio access network based upon one or more received signal strength indicator values;
   in response to failing to obtain synchronization with a radio access network, performing a second received signal strength indicator scan on the plurality of frequency bands.

2. The method of claim 1, where the radio access network is an Global System for Mobile communications, a Universal Terrestrial Radio Access network, a evolved universal terrestrial radio access or cellular networks employing Wideband Code Division Multiple Access or High Speed Packet Access.

3. The method of claim 1, wherein synchronization attempted based upon one or more parameters designated in a code search of the plurality of received signal strength indicator values.

4. The method of claim 3, wherein the one or more parameters in the code search remove one or more frequencies from the right and left side of a center frequency.

5. The method of claim 4, further comprising the steps of:
   attempting a second synchronization with the radio access network based upon one or more received signal strength indicator values after performing the second received signal strength indicator scan and based upon a second set of one or more parameters designated in a second code search of the plurality of received signal strength indicator values.

6. The method of claim 1, further comprising:
   processing the first received signal strength indicator scan for radio frequency noise in order to control the second received signal strength indicator scan.

7. The method of claim 6, wherein the control of the first received signal strength indicator scan further comprises:
   selecting a first frequency band among a plurality of frequency bands for testing the results of the first received signal strength indicator scan;
   performing the first received signal strength indicator scan on the first selected frequency band;
   comparing the stored results of the first received signal strength indicator values with an absolute threshold,
   in response to determining that the first received signal strength indicator values exceed the absolute threshold, permitting the second received signal strength indicator scan to be performed on this frequency band if necessary,
   in response to determining that the first received signal strength indicator values do not exceed the absolute threshold, comparing a plurality of highest first received signal strength indicator values with a relative threshold, omitting this frequency band from the second received signal strength indicator scan;
   in response to determining that the first received signal strength indicator values are within the relative threshold, omitting this frequency band from the second received signal strength indicator scan.

8. The method of claim 7, wherein in response to determining that the first received signal strength indicator values are within the relative threshold, the selected frequency band is omitted from the second received signal strength indicator scan.

9. An apparatus, comprising:
   at least one processor; and
   at least one memory storing a computer program;
   performing a first received signal strength indicator scan on a plurality of frequency bands;
   storing the results of the first received signal strength indicator scan in memory as a plurality of received signal strength indicator values;
   attempting synchronization with a radio access network based upon one or more received signal strength indicator values;
   in response to failing to obtain synchronization with a radio access network, performing a second received signal strength indicator scan on the plurality of frequency bands.

10. The apparatus of claim 9, wherein synchronization attempted based upon one or more parameters designated in a code search of the plurality of received signal strength indicator values.

11. The apparatus of claim 10, wherein the one or more parameters in the code search remove one or more frequencies from the right and left side of a center frequency.

12. The apparatus of claim 11, further comprising the steps of:
   attempting a second synchronization with the radio access network based upon one or more received signal strength indicator values after performing the second received signal strength indicator scan and based upon a second set of one or more parameters designated in a second code search of the plurality of received signal strength indicator values.

13. The apparatus of claim 9, further comprising:
  processing the first received signal strength indicator scan for radio frequency noise in order to control the second received signal strength indicator scan.

14. The apparatus of claim 13, wherein the control of the first received signal strength indicator scan further comprises:
  selecting a first frequency band among a plurality of frequency bands for testing the results of the first received signal strength indicator scan;
  performing the first received signal strength indicator scan on the first selected frequency band;
  comparing the stored results of the first received signal strength indicator values with an absolute threshold,
  in response to determining that the first received signal strength indicator values exceed the absolute threshold, permitting the second received signal strength indicator scan to be performed on this frequency band if necessary,
  in response to determining that the first received signal strength indicator values do not exceed the absolute threshold, comparing a plurality of highest first received signal strength indicator values with a relative threshold, omitting this frequency band from the second received signal strength indicator scan;
  in response to determining that the first received signal strength indicator values are within the relative threshold, omitting this frequency band from the second received signal strength indicator scan.

15. The apparatus of claim 14, wherein in response to determining that the first received signal strength indicator values are within the relative threshold, the selected frequency band is omitted from the second received signal strength indicator scan.

16. The apparatus of claim 15, wherein the apparatus is a cellular phone, a personal digital assistant (PDA), a wireless modem, a wireless communication device, a laptop, a netbook, a tablet or any other device cable of communicating with the radio access network.

17. A program storage device readable by a machine, tangibly embodying a program of instructions executable by the machine for causing to perform operations, said operations comprising:
  performing a first received signal strength indicator scan on a plurality of frequency bands;
  storing the results of the first received signal strength indicator scan in memory as a plurality of received signal strength indicator values;
  attempting synchronization with a radio access network based upon one or more received signal strength indicator values;
  in response to failing to obtain synchronization with a radio access network, performing a second received signal strength indicator scan on the plurality of frequency bands.

18. The program storage device of claim 17, wherein synchronization attempted based upon one or more parameters designated in a code search of the plurality of received signal strength indicator values.

* * * * *